(12) United States Patent
Ludwig et al.

(10) Patent No.: US 7,681,187 B2
(45) Date of Patent: Mar. 16, 2010

(54) METHOD AND APPARATUS FOR REGISTER ALLOCATION IN PRESENCE OF HARDWARE CONSTRAINTS

(75) Inventors: Michael G. Ludwig, Sunnyvale, CA (US); Jayant B. Kolhe, Milpitas, CA (US); Robert Steven Glanville, Cupertino, CA (US); Geoffrey C. Berry, San Francisco, CA (US); Boris Beylin, Palo Alto, CA (US); Michael T. Bunnell, Pleasanton, CA (US)

(73) Assignee: NVIDIA Corporation, Santa Clara, CA (US)

( * ) Notice: Subject to any disclaimer, the term of this patent is extended or adjusted under 35 U.S.C. 154(b) by 913 days.

(21) Appl. No.: 11/096,404

(22) Filed: Mar. 31, 2005

(65) Prior Publication Data

US 2006/0225061 A1 Oct. 5, 2006

(51) Int. Cl.
G06F 9/45 (2006.01)
(52) U.S. Cl. ................ 717/151; 717/152; 717/153; 717/154; 717/155
(58) Field of Classification Search ......... 717/151–161, 717/140, 144, 146, 149, 116; 712/219, 226
See application file for complete search history.

(56) References Cited

U.S. PATENT DOCUMENTS

| | | | | |
|---|---|---|---|---|
| 4,571,678 | A * | 2/1986 | Chaitin | 717/156 |
| 5,274,818 | A * | 12/1993 | Vasilevsky et al. | 717/149 |
| 5,367,684 | A * | 11/1994 | Smith | 717/140 |
| 5,659,754 | A * | 8/1997 | Grove et al. | 717/158 |
| 5,890,000 | A * | 3/1999 | Aizikowitz et al. | 717/154 |
| 5,946,491 | A * | 8/1999 | Aizikowitz et al. | 717/158 |
| 6,090,156 | A * | 7/2000 | MacLeod | 717/157 |
| 6,298,438 | B1 * | 10/2001 | Thayer et al. | 712/226 |
| 6,421,809 | B1 * | 7/2002 | Wuytack et al. | 716/2 |
| 6,421,824 | B1 * | 7/2002 | Click et al. | 717/144 |
| 6,964,041 | B2 * | 11/2005 | Kawaguchi | 717/151 |
| 7,103,880 | B1 * | 9/2006 | Morris et al. | 717/140 |
| 7,200,738 | B2 * | 4/2007 | Crook et al. | 712/219 |
| 7,257,806 | B1 * | 8/2007 | Chen et al. | 717/154 |
| 2005/0039167 | A1 * | 2/2005 | Fernandes et al. | 717/116 |

OTHER PUBLICATIONS

Proebsting, et al. "Demand-Driven Register Allocation", 1996, ACM, p. 683-710.*

Zhang, et al. "Binary Translation to Improve Energy Efficiency through Post-pass Register Re-allocation", 2004, ACM, p. 74-85.*

(Continued)

*Primary Examiner*—Wei Y Zhen
*Assistant Examiner*—Qamrun Nahar
(74) *Attorney, Agent, or Firm*—Townsend and Townsend and Crew LLP

(57) ABSTRACT

A method and apparatus for optimizing register allocation during scheduling and execution of program code in a hardware environment. The program code can be compiled to optimize execution given predetermined hardware constraints. The hardware constraints can include the number of register read and write operations that can be performed in a given processor pass. The optimizer can initially schedule the program using virtual registers and a goal of minimizing the amount of active registers at any time. The optimizer reschedules the program to assign the virtual registers to actual physical registers in a manner that minimizes the number of processor passes used to execute the program.

19 Claims, 7 Drawing Sheets

OTHER PUBLICATIONS

Balasubramonian, et al. "Dynamically Allocating Processor Resources between Nearby and Distant ILP", 2001, IEEE, p. 26-37.*

Yang, et al. "Inter-Procedural Stacked Register Allocation for Itanium Like Architecture", 2003, ACM, p. 215-225.*

* cited by examiner

METHOD AND APPARATUS FOR REGISTER ALLOCATION IN PRESENCE OF HARDWARE CONSTRAINTS

BACKGROUND

1. Field of the Invention

The present disclosure relates to the field of electronic processing. More particularly, the present disclosure relates to register allocation and scheduling of program code.

2. Description of Related Art

Various applications can be implemented in the form of machine readable instructions stored in one or more storage devices and executed on associated hardware. Devices can be configured to perform a limited range of applications through embedded software executing on local hardware. Other devices can be general purpose devices on which applications can be configured through execution of software.

In typical applications, the software is developed in what is referred to as a high level language that can be relatively independent of the type of hardware used to execute the application. The high level language can be compiled or otherwise translated into hardware specific low level language instructions. The instructions can be loaded into a storage device, such as memory, and hardware can execute the instructions.

As programs evolve to require increasingly complex processes to be performed in ever decreasing time periods, the performance of hardware architectures eventually approach limitations that do not permit the near instantaneous execution of code desired of many applications. The program execution time is typically limited by an identifiable set of bottlenecks in the hardware architecture that limit the processing capabilities of the architecture.

In early or more simple hardware architectures, a single processor core can be configured to access from associated memory, a single instruction or operand per instruction cycle. The processor can operate based on a clock signal and each instruction cycle can be one or more clock cycles.

In such a simple hardware architecture, the clock speed can be increased to increase the execution time for the application. However, there are practical limitations to clock rates, although presently available processors can operate at clock rates on the order of hundreds of megahertz and may include internal multipliers that increase the effective clock rate to several gigahertz.

More complicated architectures can include multiple processing paths that are configured in parallel. In a basic variation of the multiple path architecture, each processing path can operate independently of any other processing path and each processing path can have hardware dedicated to the particular path.

The program execution time in an architecture having multiple processing paths can be improved in part by increasing the clock rates of the processing paths. Additionally, the program execution time may be improved by efficient scheduling of instructions executed in each individual processing path. Thus, because the compiler schedules the low level instructions translated from higher level code, the operation of the compiler can have significant impact on the execution time of an application or program.

It is desirable to optimize the allocation of resources consumed and the scheduling of instructions in parallel processing applications in order to optimize the execution of the application. One benefit of such optimization can be a decrease in the execution time of the application with no hardware changes.

BRIEF SUMMARY OF THE DISCLOSURE

A method and apparatus are disclosed for optimizing register allocation during scheduling and execution of program code in a hardware environment. The program code can be compiled to optimize execution given predetermined hardware constraints. The hardware constraints can include the number of register read and write operations that can be performed in a given processor pass. The optimizer can initially schedule the program using virtual registers and a goal of reducing the amount of active registers at any time. Information and constraints based on the initial schedule can be used to allocate the virtual registers to physical registers. The optimizer reschedules the program based in part on the constraints imposed by the physical register assignment in a manner that minimizes the number of processor passes used to execute the program.

A method of code optimization in presence of hardware constraints is disclosed. The method includes scheduling instruction codes using virtual registers in a manner that tends to minimize simultaneous active registers while minimizing a number of passes of a processing unit, allocating the virtual registers to physical registers according to a plurality of register allocation orders to produce a corresponding plurality of physical register allocations, determining a conflict value for each register allocation from the plurality of physical register allocations, determining a physical register allocation corresponding to a least conflict value, and rescheduling the instruction codes using the physical register allocation to optimize the code by further reducing a number of conflicts.

Another embodiment of a method of code optimization in presence of hardware constraints disclosed herein includes generating graph coloring of nodes of a program to identify a plurality of virtual registers, scheduling the program using a reverse look-ahead scheduler having a hardware model to reduce a number of live virtual registers while tending to minimize a number of processor passes, annotating the virtual registers with vector component preferences, allocating the virtual registers to physical registers using a plurality of register allocation orders to generate a corresponding plurality of register allocations, selecting a register allocation from the plurality of register allocations based on a conflict metric, and rescheduling the program in a forward scheduler to optimize the code by further reducing conflicts.

An embodiment of an apparatus configured to optimize code in the presence of hardware constraints disclosed herein includes a reverse look-ahead scheduler configured to schedule a program using a plurality of virtual vector registers in a manner that tends to minimize live virtual registers while minimizing processing passes, a register annotator coupled to the reverse look-ahead scheduler and configured to annotate each of the plurality of virtual vector registers with vector component preferences, a register allocator coupled to the register annotator and configured to generate a plurality of register allocations corresponding to a plurality of allocation orders by allocating virtual vector registers to physical vector registers based in part on an allocation order, and a forward scheduler coupled to the register allocator and configured to select a register allocation from the plurality of register allocations and reschedule the program with the physical vector registers to optimize the code by reducing schedule conflicts identified during register allocation.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

Figure 1:
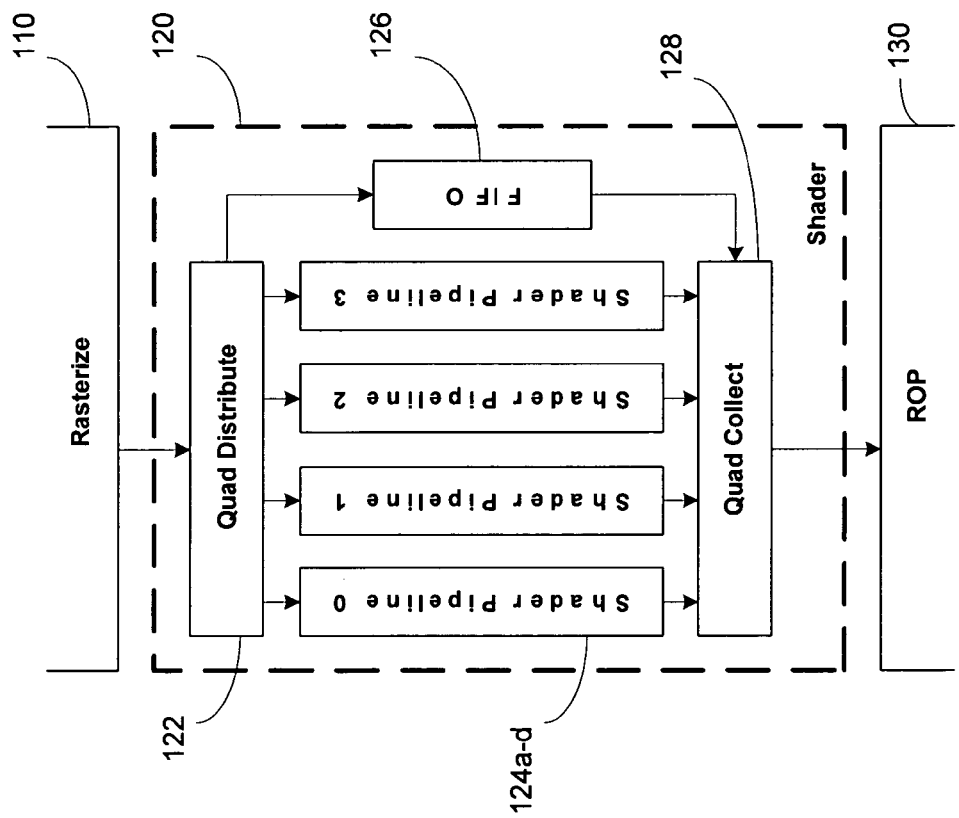
FIG. 1 is a simplified functional block diagram of an embodiment of parallel pipelined processing.

Hardware architectures have hardware constraints that can affect the processing capabilities of the architecture. Some of the constraints can be fixed while other constraints may be dynamic. For example, the number of clock cycles used to execute a particular instruction may be a fixed constraint that is not subject to optimization. In another example, the number of registers allocated to a particular process may be dynamically assigned, and the manner in which registers are allocated can be optimized to optimize a particular performance metric, such as execution time.

A parallel processing hardware architecture having a pool of registers that are shared among the various parallel processing paths can optimize program execution within the various processing paths, in part, by optimizing the register allocation. The compiler used to translate the high level language to a code operated on by the processing paths can control register allocation. The compiler can be configured to optimize the register allocation and associated instruction scheduling or other configurable resources.

Register allocation techniques and scheduling techniques are known in compiler literature. For example, register allocation using graph coloring of interference graph is used by compilers for scalar processors. However, machine characteristics such as allocating virtual registers to vector registers (either fully to a vector register or multiple virtual registers to parts of same vector register), reducing total number of registers used in the program to allow for more thread level parallelism, optimizing to schedule as many instructions per pass under the constraints of limited read and write bandwidth to register file with specific length of vector registers, optimizing to allocate certain virtual registers to specific parts of same vector register to allow dual issue of instructions, and optimizing to consume writes of an instruction in same pass by another instruction to reduce pressure on limited read bandwidth of register file, pose unique set of challenges and require a system where scheduling and register allocation interact closely.

The compiler can optimize the register allocation by initially scheduling a program using virtual registers. The compiler can be configured to schedule the program in a manner that minimizes the number of virtual registers that are in use at any particular time during execution of the program. In one embodiment, the compiler includes a reverse look-ahead scheduler having knowledge of the hardware constraints. In one embodiment, the scheduler can be configured to schedule the instructions, using the virtual registers, in a manner that attempts to maintain a number of live registers below a predetermined threshold. In another embodiment, the scheduler can be configured to perform instruction scheduling using virtual registers to minimize register liveness.

The compiler can determine what constraints the schedule imposes on the register assignment and can track the constraints associated with the virtual registers. The compiler can allocate the virtual registers to physical registers within the hardware architecture. The compiler can allocate the virtual registers to physical registers using one of a plurality of register allocation processes. For example, the compiler can allocate the virtual registers to physical registers in differing orders to obtain a physical register allocation that conforms to predetermined hardware constraints. The compiler can then reschedule the program in light of the physical register assignment in a manner that optimizes the execution of the instructions.

The following description of embodiments of the invention are provided in the context of a computer graphics hardware architecture having multiple parallel processors. The use of parallel processing hardware architecture can be found in a variety of graphic processors. The parallel processors can be part of a fragment shader, and the number of parallel processors can be on the order of one hundred or more. Of course, the invention is not limited to the graphics environment, nor is the invention limited to a fragment shader architecture.

In real-time computer graphics applications, computer systems can include graphics processing subsystems adapted to accelerate the rendering process that mathematically models the interaction of light with a three dimensional scene from a given viewpoint. The rendering process can be used to generate a two-dimensional image of a scene from the given viewpoint, and is analogous to taking a photograph of a real-world scene.

In computer systems, the rendering process is typically divided between a computer's general purpose central processing unit (CPU) and the graphics processing subsystem that can include one or more dedicated graphics processing units. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

The graphics processing sub-system can include vertex processors, which process two- or three-dimensional vertices, rasterizer processors, which process geometric primitives defined by sets of two- or three-dimensional vertices into sets of pixels or sub-pixels, referred to as fragments, and fragment processors that process fragments to determine their color and other attributes.

The programmable fragment processor is often the bottleneck in improving rendering performance. Typically, the programmable fragment processor executes its shading program once for each fragment rendered. Fragment shading programs can include hundreds or thousands of instructions and each rendered image can be generated by millions of fragments. The computational requirements of the fragment processor are enormous.

FIG. 1 is a simplified functional block diagram of an embodiment of parallel pipelined processing unit 100. The processing unit 100 can be, for example, a vertex processing unit, also referred to as a vertex shader, that executes one or more vertex programs on each vertex to create a transformed vertex. The vertex processing unit is programmable and rendering applications can specify the vertex program to be used for any given set of vertices.

In a simple embodiment, the vertex program transforms a vertex from a three-dimensional world coordinate system to a two-dimensional screen coordinate system. More complicated vertex programs can be used to implement a variety of visual effects, including lighting and shading, procedural geometry, and animation operations. Numerous examples of such "per-vertex" operations are known in the art and a detailed description is omitted as not being critical to understanding the present invention. Vertex shader programs can implement algorithms using a wide range of mathematical and logical operations on vertices and data, and can include conditional or branching execution paths and direct and indirect memory accesses.

A rasterization stage 110 converts geometric primitives into one or more pixel fragments. The rasterization stage 110 can receive the geometric priomitives from prior processing stages (not shown) in a graphics processing unit or a central processing unit A pixel fragment defines a set of one or more pixels to be potentially displayed in the rendered image. Each pixel fragment coming out of the rasterization stage 110 includes information defining the potential coverage of the associated geometric primitive in the rendered image, for example, image coordinates of the pixels associated with the fragment and sub-pixel coverage of the associated geometric primitive at that pixel location. The pixel fragments are provided to the fragment processor 120, discussed below.

The fragment processor 120 uses rasterizer-generated position information associated with each pixel fragment in conjunction with the per-vertex and per-geometric primitive attributes from a Color Assembly and Plane Equation Setup unit (not shown) and in conjunction with a fragment shader program to determine the output values (for example color and depth) of each fragment. The fragment processor 120 is typically programmable. A pixel fragment program, also referred to as a pixel or fragment shader, is executed within the fragment processor 120 on each pixel fragment to determine an output color value for a pixel. Although the pixel fragment program operates independently of the vertex shader program, the pixel fragment program may be dependent upon information created by or passed through previous stream processing units, including information created by a vertex program.

Rendering applications can specify the pixel fragment program to be used for any given set of pixel fragments. Pixel fragment programs can be used to implement a variety of visual effects, including lighting and shading effects, reflections, texture mapping and procedural texture generation. Numerous examples of such "per-pixel" operations are known in the art and a detailed description is omitted as not being critical to understanding the present invention. Pixel fragment shader programs can implement algorithms using a wide range of mathematical and logical operations on fragments and data, and can include conditional or branching execution paths and direct and indirect memory accesses.

The fragment processor 120 can include a fragment shader distributor 122, a plurality of fragment shader pipeline units 124a-124d, a First In-First Out (FIFO) buffer 126, and a fragment shader collector 128. In the example of FIG. 1, there are four fragment shader pipelines 124a-124d. However, alternate embodiments can include only one or any other number of fragment shader pipelines 124a-124d, limited only by the manufacturing process used to create the graphics processing subsystem.

In one embodiment, the fragment shader distributor 122 receives a stream of fragments from the rasterization stage 110 (and their associated rasterizer-generated attributes) along with their associated per-geometric primitive fragment attributes from the color assembly and plane equation unit (not shown).

Each of the fragment shader pipelines 124a-d can be adapted to independently execute the instructions of a fragment shader program on each of the fragments in a segment. In an embodiment, each fragment shader pipeline, for example 124a, includes a number of execution stages that perform a perspective correction operation, a texture map lookup operation, a blending operation, and other operations. A register file in each fragment pipeline unit 124a can store data values associated with each fragment group as it is executed. For a complex fragment shader program, the fragment groups of a segment recirculate through the fragment shader pipeline 124a one or more times, with each subsequent pipeline pass executing additional portions of the fragment shader program.

As fragment groups are recirculated back to the beginning of the fragment shader pipeline 124a for having additional instructions applied to them, the register values computed during that pass through the fragment shader pipeline 124a for each fragment are used to update the register file state of the respective fragment. In an embodiment, each pipeline stage of the fragment shader pipeline 124a receives instructions, in the form of microcode, from a shader instruction unit. As will be discussed in further detail below, the distribution and scheduling of the microcode instructions to the various fragment shader pipelines 124a-d can be optimized to optimize the execution of the code within each fragment shader pipeline 124a.

In one embodiment, the compiler that is used to generate, schedule, and distribute the microcode instructions can operate on high level fragment shader program prior to the execution of the application containing the fragment shader program. In another embodiment, the compiler can operate to generate, schedule, and distribute the microcode instructions during the execution of the application containing the fragment shader program.

Each fragment shader pipeline, for example 124a, typically uses several data registers to temporarily store data while executing the fragment shader program on each fragment. Because each fragment is executed by a separate instance of the fragment shader program, each fragment requires its own set of data registers. In an embodiment, each fragment shader pipeline 124a can be dynamically allocated its data registers. The shaded fragments output from the fragment shader pipelines 124a-d and the data passed through the FIFO 126 are collected in a quad collector 128.

The shaded fragments are output to the raster operations and storage unit 130, along with attributes such as fragment color, depth, and stencil values. The raster operations unit 130 integrates the fragments output from the fragment processor 120 with the portion of the rendered image already stored in the frame buffer. Fragments can be blended or masked with pixels previously written to the rendered image in the frame buffer. Depth buffers, alpha buffers, and stencil buffers can also be used to determine the contribution of each incoming fragment, if any, to the rendered image. The combination of each incoming fragment and any previously stored pixel values in the frame buffer can be output to a frame buffer (not shown) as part of a rendered image.

Figure 2:
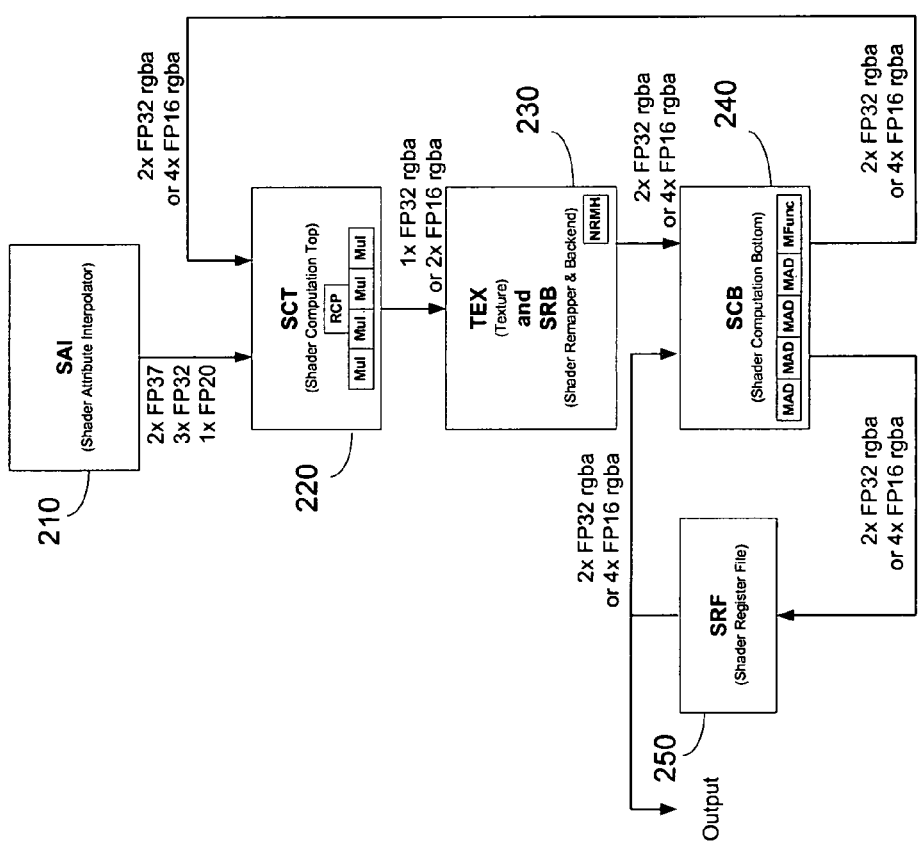
FIG. 2 is a simplified functional block diagram of an embodiment of a processor.

FIG. 2 is a simplified functional block diagram of an embodiment of a fragment shader pipeline 124, such as shown in the parallel pipelined processing unit 100 of FIG. 1.

The attributes of this embodiment of the fragment shader pipeline 124 are discussed in detail because the attributes can define the hardware constraints used by the compiler or code optimizer when generating the optimized fragment shader code.

The fragment shader pipeline 124 includes multiple execution units. As will be discussed below, each execution unit can execute up to two instructions per cycle. The fragment shader pipeline includes a shader attribute interpolator (SAI) 210 coupled to a shader computation top (SCT) 220. The output of the SCT 220 is coupled to a texture and shader remapper backend (TEX) 230. The output of the TEX 230 is coupled to a shader computation bottom (SCB) 240. The SCB 240 can read and write register values to and from a shader register file (SRF) 250. Additionally, the SRF can pass register values to the input of the SCT 220. One shader pass is defined as program instructions executed on a 2×2 set of fragments, referred to as a quad, that passes through the blocks SCT 220, TEX 230, and SCB 240.

The fragment shader pipeline 124 can be configured to operate on vector registers having fields defined for x, y, z, and w values. Each of the SCT 220, TEX 230, and SCB 240 can be configured to execute a single vector instruction on one or more registers, an in some instances can be configured to simultaneously execute two instructions, each operating on a subset of the vector register fields. The term co-issue refers to two instructions executing in different execution units of the same pass, while the term dual issue refers to two instructions issued for simultaneous execution in the same execution unit, for example, the SCT 220, TEX 230, or SCB 240.

To dual issue instructions in an execution unit, the operands may need to be distributed in the registers in a predetermined manner that is dependent on the instructions. For example, some instructions may prefer a left bias, using the x, y, and z fields of the vector register. Other instructions may prefer a right bias, using the w or z and w fields of the vector register. Still other instructions may be used under special operating conditions and can use the x, z, and w fields of the vector register. Of course in other embodiments, the instructions may be configured to use or prefer other operand distributions.

The SAI 210 can be configured to produce interpolated attributes, including texture coordinates, barycentric coefficients, and depth, which can be expressed in either the z or w fields of a vector. The SAI 210 can produce the interpolated attributes using a plurality of sum-of-product arithmentic units. The interpolated texture coordinates and fragment depth values can be used by the SCT 220 and/or the SCB 240. Barycentric coefficients can be used, for example, to computing primary and secondary colors and for interpolated fog distances.

The SCT 220 can be configured to compute the perspective correction of interpolated attributes output from the SAI 210. The SCT 220 can include a reciprocal unit and a plurality of multipliers. The input operands used in the SCT 220 can come from the SRF 250 via the SCB 240, from the SAI 210, or as a vector constant. The SCT 220 can support dual issue of instructions provided the two parallel instructions do not depend on one another. In one embodiment, the SCT 220 can be configured to support dual issue by segregating the vector fields to support parallel instructions, where one instruction utilizes three of the four available vector fields and another instruction using the one remaining vector field, or where each instruction uses two distinct and adjacent vector fields. The SCT 220 may also utilize registers where the vector components are divided in a manner where not all register components are utilized, for example 1×1, 2×1, or 1×2.

The TEX 230 can be configured to perform texture lookups and can remap them to a particular format for storage in a register. For example, the TEX 230 can remap texture lookups as 16 or 32 bit floating point numbers that can be stored in fields of the registers. In one embodiment, the TEX 230 can support dual issue of instructions, but the format of the two parallel instructions may be limited to any texture instruction in combination with a normalization instruction. Additionally, the TEX 230 can be configured to support dual issue of instructions where the instructions include a move of color and a texture instruction.

The SCB 240 can perform additional fragment shader operations required to generate the shaded pixels. The SCB 240 can be configured to include a plurality of multiply-add arithmetic units and a multi-functional unit configured to execute scalar instructions. The SCB 240 can support dual issue execution of two separate instructions in parallel in much the same manner as the SCT 220. The instructions can be configured as a pair of "3 and 1" instructions or a pair of "2 and 2" instructions, where the numbers refer to the number of vector fields used by the instructions.

The SRF 250 can be configured as a pool of vector registers that can be shared between the various fragment shader pipelines in a graphic processing unit. The registers can be 128 bits that can be organized in a variety of predetermined configurations. The registers can be configured, for example, as 16 or 32 bit floating point vector registers. Thus, in one configuration, each of x, y, z, and w fields in a register can store a 32 bit floating point number. In another configuration, a register can store two four-component 16 bit floating point values. In another configuration, a register can store a combination of 32 bit and 16 bit values that occupy a total of 128 bits.

The number of physical registers available in the SRF 250 can be limited because of the relatively large physical area and cost associated with implementing registers in an integrated circuit processor. A register that is currently allocated to a particular fragment shader pipeline 124 consumes a resource that could otherwise support some other execution unit. The limited number of registers is a hardware constraint that can limit the ability to effectively utilize the fragment shader pipelines. For example, if the total number of registers are actively consumed by a number of fragment shader pipelines that is less than the total number of fragment shader pipelines, some fragment shader pipelines go unutilized due to a register bandwidth limitation. If the processes can be scheduled and executed with fewer register allocations, the remaining registers can be used to support an additional fragment shader pipeline.

The ability to perform dual issue of instructions in the various execution units can depend on the ability for the operands to be populated in the proper register fields or in the ability to permute or otherwise reorganize the position of the operands to the desired register fields. However, in some hardware embodiments, each execution unit may not have the ability to permute register contents in any desired fashion. For example, the SCT 210 and SCB 240 may have the ability to left or right shift vector registers and permute or otherwise swizzle the vector registers to reorganize the vector fields. However, the TEX 230 may only have limited ability to reorganize the contents of the vector registers. For example, the TEX 230 may only have the ability to left or right shift the vector register contents and may not have the ability to swizzle the contents or apply input modifiers such as absolute value, negate, or negate absolute value.

Program execution may also be limited by the number of SRF 250 reads or writes that can be performed in a single shader pass. For example, the SRF 2250 can have two read ports and two write ports, and the embodiment of FIG. 2 may be limited to two register reads per shader pass and two register writes per shader pass. The data read from the SRF 250 can be sent directly to the SCB 240 where they are consumed in the SCB 240 or passed along to the SCT 220 or TEX 230. Similarly, the data written to the SRF 250 can be sourced from the SCB 240.

The read and write operations do not necessarily occur at the same time and read operations may be time offset from write operations. Additionally, the two register reads sent to the SCB 240 are not necessarily consumed in the same shader pass. The register reads can be used by the SCB 240 in the same shader pass that the read occurs, but may also be used in the SCT 220 or TEX 230 of the next shader pass. SRF 250 writes, in contrast, occur in the same shader pass in which they are consumed.

Figure 3:
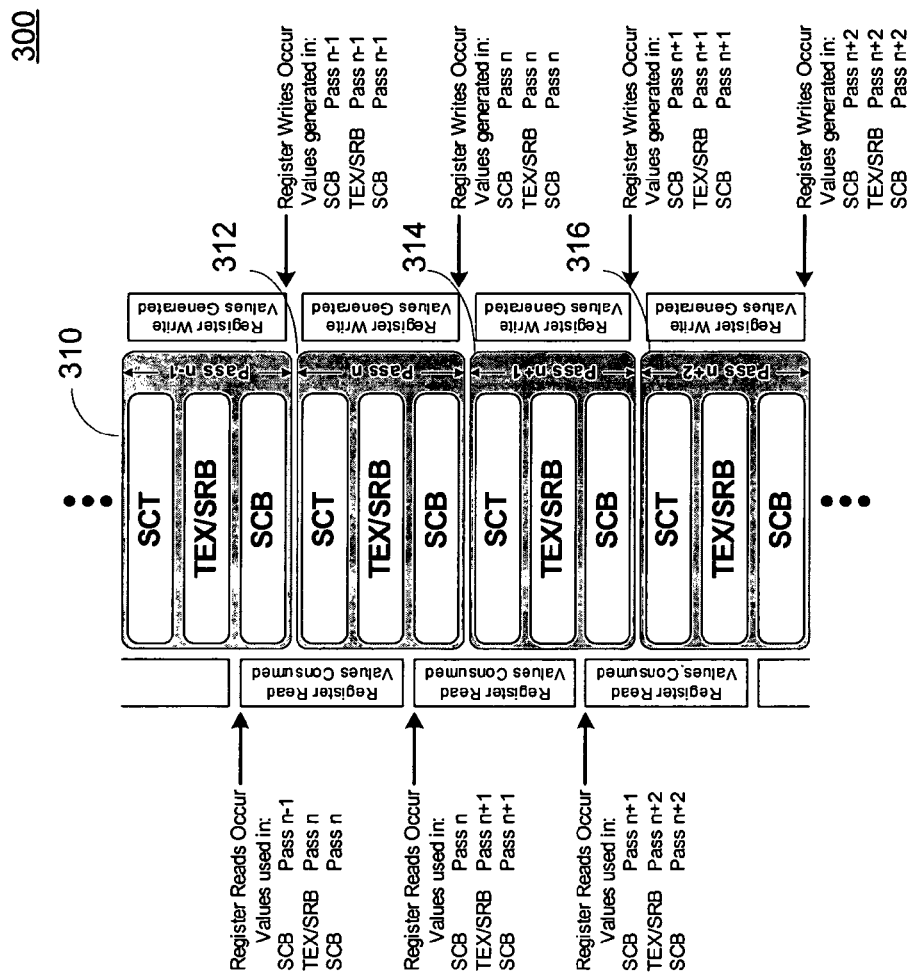
FIG. 3 is a simplified timing diagram illustrating an example of hardware constraints within a processor.

FIG. 3 is a simplified timing diagram 300 illustrating an example of read and write timing within a fragment shader pipeline. The timing diagram 300 illustrates four shader passes, 310, 312, 314, and 316 in which fragments run through the execution units SCT, TEX, and SRB. The register reads are illustrated on the left of the timing diagram, while the register writes are illustrated on the right of the timing diagram. The shader passes 310, 312, 314, and 316 can occur during a portion of a fragment shader program executing on a fragment shader pipeline, such as the fragment shader pipeline shown in FIG. 2.

In the n−1 shader pass 310, the register write values can be generated during the shader pass and can be written to the register file at the conclusion of execution of instructions in the SCB. The register file bandwidth may limit the number of writes to a predetermined number, such as two. Prior to the end of the n−1 shader pass 310, and before the execution of instructions in the SCB, the register reads from the register file can be sourced to the SCB. The number of register reads can be limited by the register file bandwidth and can be limited to two register reads. The registers read can be used in the n−1 shader pass 310 of the SCB and the n shader pass 312 of the SCT and TEX. Therefore, the reads are offset by one shader pass when they are used to source values for SCT or TEX.

Therefore, a particular hardware architecture can include multiple hardware constraints that can be monitored when optimizing the scheduling of instructions and the allocation of registers corresponding to the instructions. The previous description of the hardware architecture is provided to illustrate an example of the potential hardware constraints present in a graphics processing unit having multiple fragment shader pipelines configured in parallel. Of course, other hardware architectures can have different hardware constraints.

The constraints associated with the hardware architecture described above include multiple vector registers that can be allocated for instructions, where the contents of the vector registers may be permuted or swizzled depending on the particular execution unit constraints. The thread level parallelism depends on the total number of registers that are allocated to active execution units in each thread. As registers are allocated to active threads, the amount of available register resources are diminished. If all of the registers are allocated before the total number of available parallel processes are populated, the number and allocation of registers becomes a processing and thread parallelism bottleneck.

Each parallel processing thread has limited register read and write bandwidth. The hardware embodiment described above is limited to two register reads and two register writes per shader pass. Each pass through the execution units can include a stream of relatively independent vector instructions, and the execution units have a limited ability to execute two instructions simultaneously. However, certain instructions may require a particular subset of registers in the vector registers to allow them to be scheduled in the same pass. For example, registers in a vector register may need to be allocated in xyz/w or xy/zw configuration for certain instructions or to enable dual issue of instructions.

Having multiple execution units operating in a single shader pass allows for some level of optimization relating to the use of registers. The results of some instructions executed during a pass may be consumed by other instructions executed during the same pass. This use of intermediate values generated by execution units within a single pass can be referred to a register forwarding. The generation and consumption of results within a single pass allows operands to be passed without consuming any register bandwidth for reading from the register file.

Figure 4:
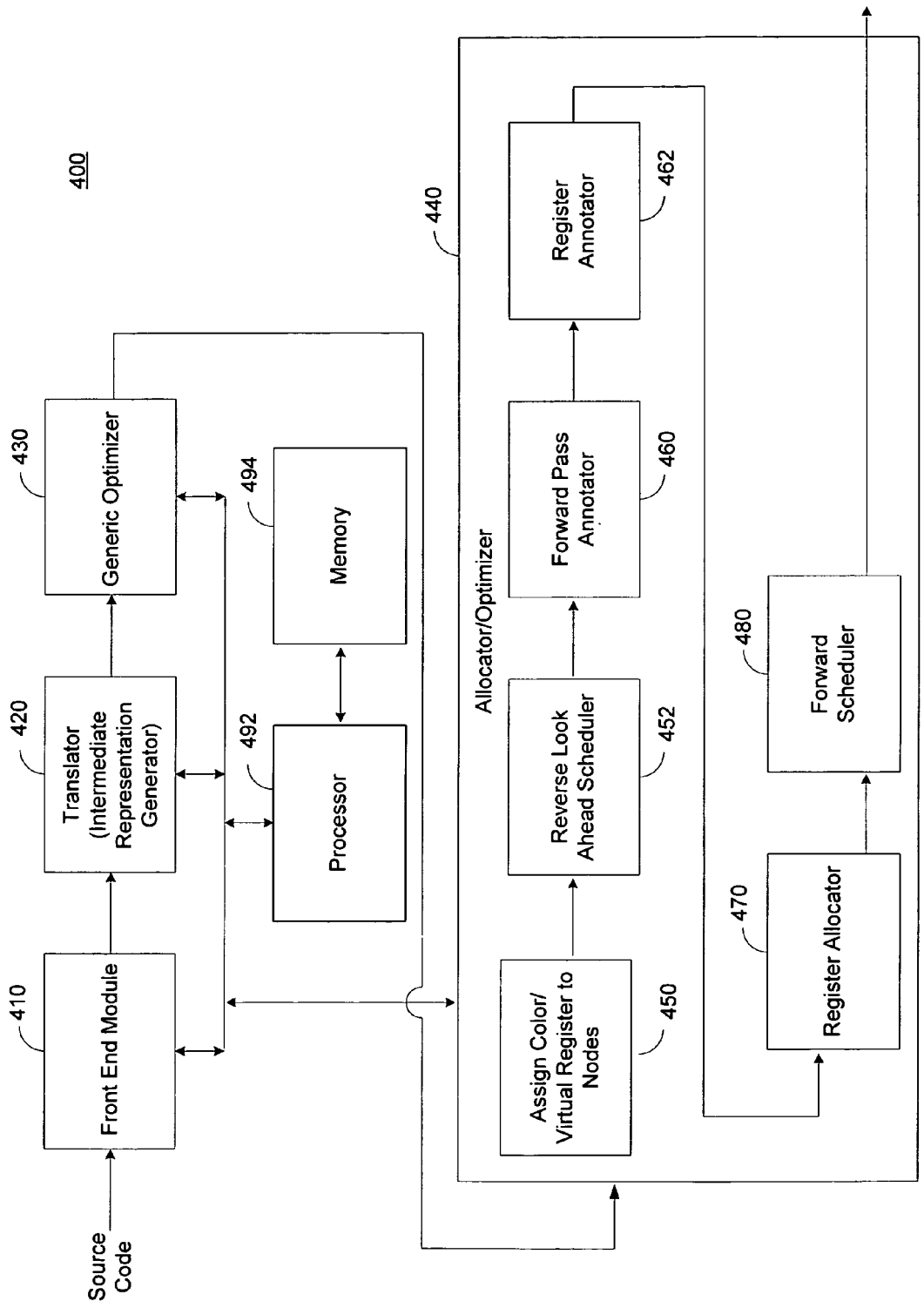
FIG. 4 is a simplified functional block diagram of an embodiment of a code optimization module.

FIG. 4 is a simplified functional block diagram of an embodiment of a code optimizer 400. The code optimizer 400 can be configured to optimize the scheduling of program instructions and allocation of registers in the presence of hardware constraints. The code optimizer 400 can be implemented within a general purpose computer having a graphics processor, such as the graphics processing unit including the parallel pipelined processing unit of FIG. 1. Alternatively, the code optimizer 400 can be implemented in a graphics processing unit having the parallel pipelined processing unit of FIG. 1. Some or all of the modules in the code optimizer 400 can be implemented in hardware, software, or a combination of hardware and software. Where all or portions of a module are implemented in software, the software can be stored as one or more machine usable instructions in memory 494 and executed by a processor 492.

In one embodiment, the code optimizer 400 can be implemented as a compiler that is configured to compile source code. The object code generated from the source code can be loaded in memory for execution by one or more processors in a software application. In one embodiment, the code optimizer 400 can operate as a compiler for source code to produce object code destined for graphics intensive applications, such as games, that are executed on special purpose hardware, typically referred to as a console.

In another embodiment, the code optimizer 400 can operate on source code during the execution of the code. For example, in a graphics application require rendering, one or more fragment shader programs can be compiled by the code optimizer 400 during execution of the underlying application. In such an embodiment, the code optimizer 400 can be initiated and executed as fragment shader programs are scheduled and run in parallel pipelined processing units.

The code optimizer 400 can include a front-end module 410 configured to interface with source code. The source code can be any type of source code supported by the front-end module 410. For example, the front-end module 410 can include one or more sub-modules configured to support distinct source code languages. The various source code languages can include C, Cg, Direct3D, DirectX, OpenGL, GLSL, and the like, or some other source code.

The front-end module 410 can be coupled to a translator 420 that is configured to generate an intermediate representation of the source code. The intermediate representation can be a low level code that can be used by the application processor, such as the fragment shader pipeline of FIG. 2. The intermediate representation can be of several forms such as three address code or a control flow graph with each basic block represented as a Directed Acyclic Graph.

The output of the translator 420 can be coupled to a generic optimizer 430 that can be configured to provide general code optimization that can be independent of hardware constraints. For example, the generic optimizer 430 can be configured to ensure the intermediate language code conforms to legal code constraints and general hardware restrictions.

The output of the generic optimizer 430 can be object code that can be scheduled in one or more parallel processing units sharing a common register block. The output of the generic optimizer can be coupled to an allocator/optimizer 440 that can be configured to perform the code optimization specific to the hardware constraints. The allocator/optimizer 440 can be configured to, for example, maximize the number of simultaneous parallel pipelined processing units that are active by attempting to achieve optimal scheduling while minimizing the number of live registers, where a live register refers to a register holding a value to be sourced to an active execution unit or a register that is an imminent destination for a value from an active execution unit such that the register cannot be allocated to another processing unit.

The allocator/optimizer 440 includes a virtual register assignment module 450 that can be configured to process the intermediate code representation from the generic optimizer 430 for register allocation by graph coloring of nodes. The virtual register assignment module 450 can allocate virtual registers by assigning virtual colors with associated sizes to each of the nodes in the source code. Prior to the commencement of scheduling in module 452, some initial analysis and code transformations may be done to improve the resultant schedule. For example, some results may be achieved through alternative instructions. A first alternative may achieve the result in a single instruction, but the execution of the instruction may be limited to a particular execution unit. A second alternative may use more than one instruction and may use a greater number of registers than the first alternative, but may allow for greater scheduling flexibility. Initial analysis can be done to determine if it is desirable to merge multiple instructions into fewer instructions, that require fewer registers but have greater constraints relating to the machine resources that are used by the instructions.

The virtual register assignment module 450 allocates virtual registers corresponding to the virtual colors. The number of virtual registers is effectively infinite, as the virtual register assignment module 450 can continue to assign a virtual register to each node as a register is required. Thus, each virtual register represents a register that will be used during execution of the intermediate code. However, at this time the virtual registers are not yet assigned to physical registers in the register file.

The output of the virtual register assignment module 450 can be coupled to a reverse look-ahead scheduler 452. The reverse look-ahead scheduler 452 can be configured to schedule instructions using virtual colors, corresponding to virtual registers, in reverse order. Each virtual register is initialized and consumed distinct from any other virtual register.

The reverse look-ahead scheduler 452 can be configured to look ahead a predetermined distance. In the context of a reverse look-ahead scheduler 452, look ahead refers to examination of potentially earlier occurring instructions, in contrast to a forward look ahead that refers to examination of potentially later occurring instructions. The look ahead distance can be based in part on the hardware architecture. In one embodiment, where the code optimizer is configured to schedule instructions for a fragment shader pipeline, such as shown in FIG. 2, the look ahead distance can relate to a shader pass. For example, the look ahead distance can be 1 shader pass, 1½ shader passes, 2 shader passes, or some other function of shader passes.

The reverse look-ahead scheduler 452 does not optimize the scheduling of instructions without regard to register allocation. Instead, the reverse look-ahead scheduler 452 is configured to schedule instructions in a manner that attempts to optimally use the multiple resources and functional units in a single pass while ensuring that the number of registers needed to support the schedule is minimized. Additionally, the reverse look-ahead scheduler 452 is configured to schedule the instructions in a manner that does not impose impossible constraints on a register allocator. Therefore, using an accurate model of the hardware architecture, the reverse look-ahead scheduler 452 schedules instructions in a manner that performs a trade off of optimum schedule to optimum register allocation.

The reverse look-ahead scheduler 452 can track any number of hardware constraints when determining the instruction schedule. The reverse look-ahead scheduler 452 can track the read and write requirements of each pass imposed by the schedule, and can schedule the instructions to maintain a schedule within the register read and write bandwidths.

The reverse look-ahead scheduler 452 can track and attempt to capitalize on hardware specific capabilities that reduce register read requirements. Such hardware specific capabilities can include register forwarding, where a register write performed in an execution unit of a previous instruction can be read in by a subsequent execution unit in another instruction of the same pass. The reverse look-ahead scheduler 452 can track and enforce register forwarding to optimize register allocation.

The reverse look-ahead scheduler 452 can track the number of live registers, and components within registers, at any point in the schedule. Recall that the fragment shader pipeline allows dual issue of instructions, where operands for distinct instructions can appear as components in the same vector register. Therefore, the reverse look-ahead scheduler 452 can be configured to track live components in addition to live registers, because the number of live components can be greater than the number of live registers.

Further, because some instructions include rigid register constraints that require that the operands be positioned in particular fields of a vector register, the reverse look-ahead scheduler 452 attempts to minimize the time between the definition of the constrained registers and their use. The reverse look-ahead register 452 can attempt to schedule instructions to consume the registers having rigid constraints near the instruction that originally defined the register.

When it appears that a register or components are live for a relatively long period of time with the same value, the reverse look ahead scheduler 452 can be configured to determine if it is more efficient to recompute the register or component values instead of continuing to occupy the register with the value. In one embodiment, the reverse look-ahead scheduler 452 can schedule instructions that cause a register value to be recomputed, rather than remain occupied, if a number of live registers exceeds a predetermined live register threshold.

The reverse look-ahead scheduler 452 can use the estimate of the register requirements at each node generated by the virtual register assignment module 450 to select the next candidate instruction for scheduling. The reverse look-ahead scheduler 452 continues to schedule each instruction in the program until all nodes have been scheduled.

The output of the reverse look-ahead scheduler 452 can be coupled to a forward pass annotator 460. The forward pass annotator 460 can be configured to mark, identify, or otherwise annotate each of the instructions in the schedule produced by the reverse look-ahead scheduler 452. In one embodiment, the forward pass annotator 460 annotates each instruction to mark the instruction with a corresponding pass through a fragment shader pipeline. Identifying the shader pass and stage associated with instructions can be advantageous so that the register read/write bandwidth requirements can be determined and conveyed to a register allocator.

The output of the forward pass annotator 460 can be coupled to a register annotator 462. The register annotator 462 can mark, identify, or otherwise annotate each of the virtual registers with a component preference. In the hardware architecture described above, the virtual registers can be vector registers, and the vector registers can include multiple components. For example, a vector register can have x, y, z, and w components. The components can be arranged in the register from left to right in the order of x, y, z, and w. The register components can be reorganized in some execution units. However, the instruction schedule may include a particular preference for the component arrangement.

Some instructions have rigid component constraints, while other registers may have soft constraints that are a function of the instruction schedule. For example, the reverse look-ahead scheduler 452 may have scheduled xy components of a virtual register for a particular instruction and may prefer that the values remain in the same components so that reorganization of the values is not required.

In one embodiment, the register annotator 462 can annotate each virtual register with an indication of no component preference, a left preference, a right preference, or a preference for particular components, such as x, y, and w. A left preference can indicate a preference towards the x-component of the vector register, and a right preference can indicate a preference towards the w-component.

The register annotator 462 can also be configured to generate one or more lists, tables, or links that summarize virtual register relationships. For example, the register annotator 462 can generate, for each virtual register, a list of other virtual register candidates that are scheduled to be in a write pass with the virtual register at some point in the schedule. Similarly, for each virtual register, the register annotator 462 can generate a list of other virtual register candidates that are scheduled to be in a read pass with the virtual register at some point in the schedule.

After the register annotator 462 generates the property annotations and the lists of temporal relationships, the register annotator can couple the results to a register allocator 470. The register allocator 470 can be configured to allocate the virtual registers to physical registers, such as physical registers in the SRF of FIG. 2. A register allocator 470 embodiment is discussed in further detail in FIG. 5. Because the number of physical registers is limited, the same physical registers can be allocated to one or more virtual registers. Additionally, in the case of dual issue, the same physical register can be allocated to separate virtual registers at the same time, although the individual vector components are typically not simultaneously assigned to distinct virtual registers.

The instructions can be provided to a forward scheduler 480 once the register allocator 470 assigns physical registers to each of the virtual registers. The forward scheduler 480 reschedules the instructions in a forward order. The forward scheduler 480 can reorder the previously scheduled instructions in order to remove conflicts that may have been generated by the prior combination of scheduling and register allocation.

The forward scheduler 480 can be configured to insert move instructions in resources that go unused under the initial schedule. The insertion of moves can be used to improve usage of register forwarding. For example, inserting an identity move instruction in the SCT, where a register value is moved to the same register, can cause the instruction to read its register on a different read pass compared to an instruction executed in the SCB. The result of the move instruction is to eliminate the need to consume a read for a register value that can be forwarded to the SCB. After completing forward scheduling, the schedule can be cleansed to remove any of the previously inserted move instructions that do not require register forwarding.

The forward scheduler 480 can also be configured to insert one or more nop instructions in order to prevent an instruction from floating to an unused resource, potentially preventing successful register forwarding. For example, the forward scheduler 480 can insert a nop instruction to consume all of the resources in a stage, such as the SCB, so that a following instruction that is needed for forwarding will be forced to execute on the following stage, such as the SCT.

Once the forward scheduler 480 is complete, the allocator/optimizer 440 processing is complete and the code optimizer 400 processing is also complete. The scheduled and optimized code can be provided to the appropriate processing unit, such as a fragment shader pipeline, for execution.

Figure 5:
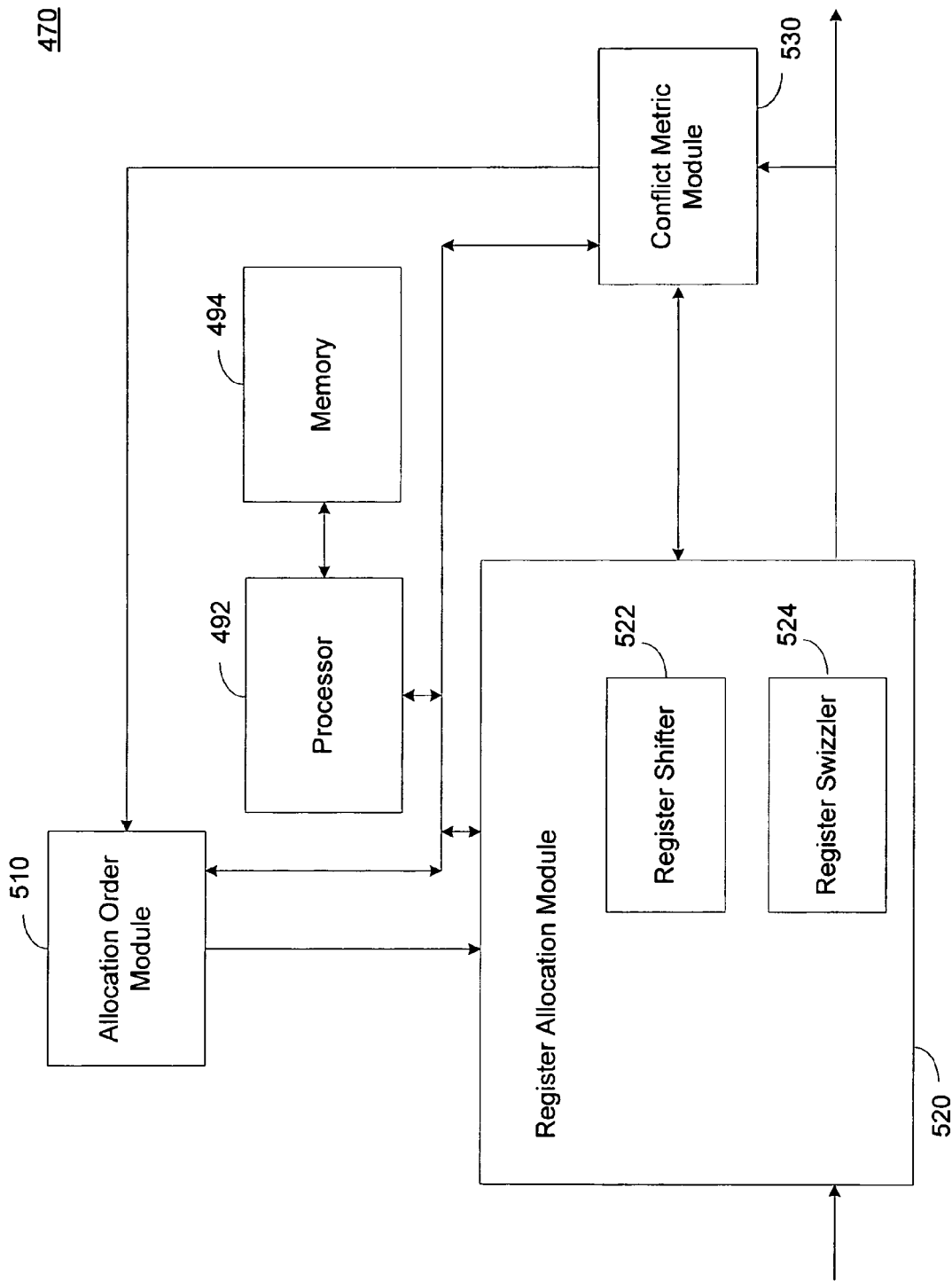
FIG. 5 is a simplified functional block diagram of an embodiment of a register allocation optimizer.

FIG. 5 is a simplified functional block diagram of an embodiment of a register allocator 470 that can be, for example, the register allocator implemented within the allocator/optimizer of FIG. 4. The various modules of the register allocator 470 can be implemented in hardware, software, or a combination of hardware and software. Where all or portions of a module are implemented in software, the software can be stored as one or more machine usable instructions in memory 494 and executed by a processor 492.

The register allocator 470 can include an allocation order module 510 coupled to a register allocation module 520. The allocation order module 510 and the register allocation module 520 can also be coupled to a conflict metric module 530.

The allocation order module 510 can store one or more predetermined register allocation ordering hierarchies. Each register allocation ordering hierarchy can be used to control the order and manner in which the register allocation module 520 selects virtual registers and allocates them to physical registers. The allocation order module 510 can include ordering hierarchies that are based on, for example, interference counts, definition order, or reference order.

The interference counts can be determined by another module during, for example, node coloring. The allocation order module 510 can control the register allocation module 520 to allocate the virtual registers according to interference count, with virtual registers having higher interference counts allocated prior to virtual registers having lower interference counts.

The allocation order module 510 can also control the register allocation module 520 to allocate the virtual registers in the order of definition. That is, the virtual registers are allocated to physical registers in the order that they appear in the instruction code. The allocation order module 510 can also control the register allocation module 520 to allocate the physical registers according to reference order. In reference order, the instructions are scanned in reverse order and the register order can be determined based on the first time a register is seen.

The allocation order module 510 may also arrange the ordering hierarchies in a predetermined order. In an embodiment, the allocation order module 510 can be configured to initially control the register allocation module 520 to allocate registers by interference count. If register allocation is again performed on the same instruction code in a subsequent iteration of register allocation, the allocation order module 510 can select definition order, and the reference order. Of course, the allocation order module 510 is not limited to the ordering hierarchies described, and may include more or fewer ordering hierarchies.

The register allocation module 520 receives the instructions and virtual register assignments and allocates the registers according to the ordering hierarchy specified by the allocation order module 510. Within each ordering hierarchy, the register allocation module 520 can allocate the physical registers using any one of a plurality of vector register component preferences. The register allocation module 520 can be configured, for example, to support three different vector register component preferences. The first component preference can be a maintained preference, or the preference associated with the virtual register. The second component preference can be shifted preference. The shifted preference can be the initial preference that can be modified by a left shift or a right shift. The third component preference can be swizzled preference, where the original component preference associated with a virtual register can be modified by any component swizzling operation. The register allocation module 520 can initially allocate the registers using the maintained preference associated with each virtual register.

Each allocation performed by the register allocation module 520 is monitored by the conflict metric module 530. The conflict metric module 530 can be configured to determine a number of conflicts associated with each of the register allocations. A conflict refers to a condition that does not satisfy a list of scheduling and register allocation constraints. For example, the hardware may constrain the read bandwidth to two reads per shader pass, but the register allocation for a particular ordering hierarchy and component preference may result in some shader passes exceeding the read bandwidth. Other constraints may raise similar conflicts. The conflict metric module 530 stores a measure of the conflicts associated with each register allocation. In another embodiment, the conflict metric module 530 may store only the minimum measure of conflicts and may also store the register allocation properties associated with the minimum conflict measure. The measure of conflicts can be, for example, the number of conflicts.

If the conflict metric module 530 determines that the measure of conflicts or the number of registers is greater than a predetermined conflict threshold, the conflict metric module 530 can direct the register allocation module 520 to reallocate the physical registers. The register allocation module 520 initially performs register allocation according to each of the possible component preferences before initiating a new ordering hierarchy.

If the number of conflicts and the number of registers is less than the corresponding predetermined thresholds, the register allocation is complete, and the register allocation and associated instruction schedule can be output to a subsequent module, such as the forward scheduler shown in FIG. 4. Ideally, the number of conflicts is substantially zero, and the conflict metric module determines the register allocation based on the allocation having the least number of registers. However, if no register allocation technique generates a number of conflicts less than the predetermined threshold, or if multiple allocations use the same number of registers, the register allocation module 520 outputs the register allocation and instruction schedule corresponding to the minimum conflicts.

Figure 6:
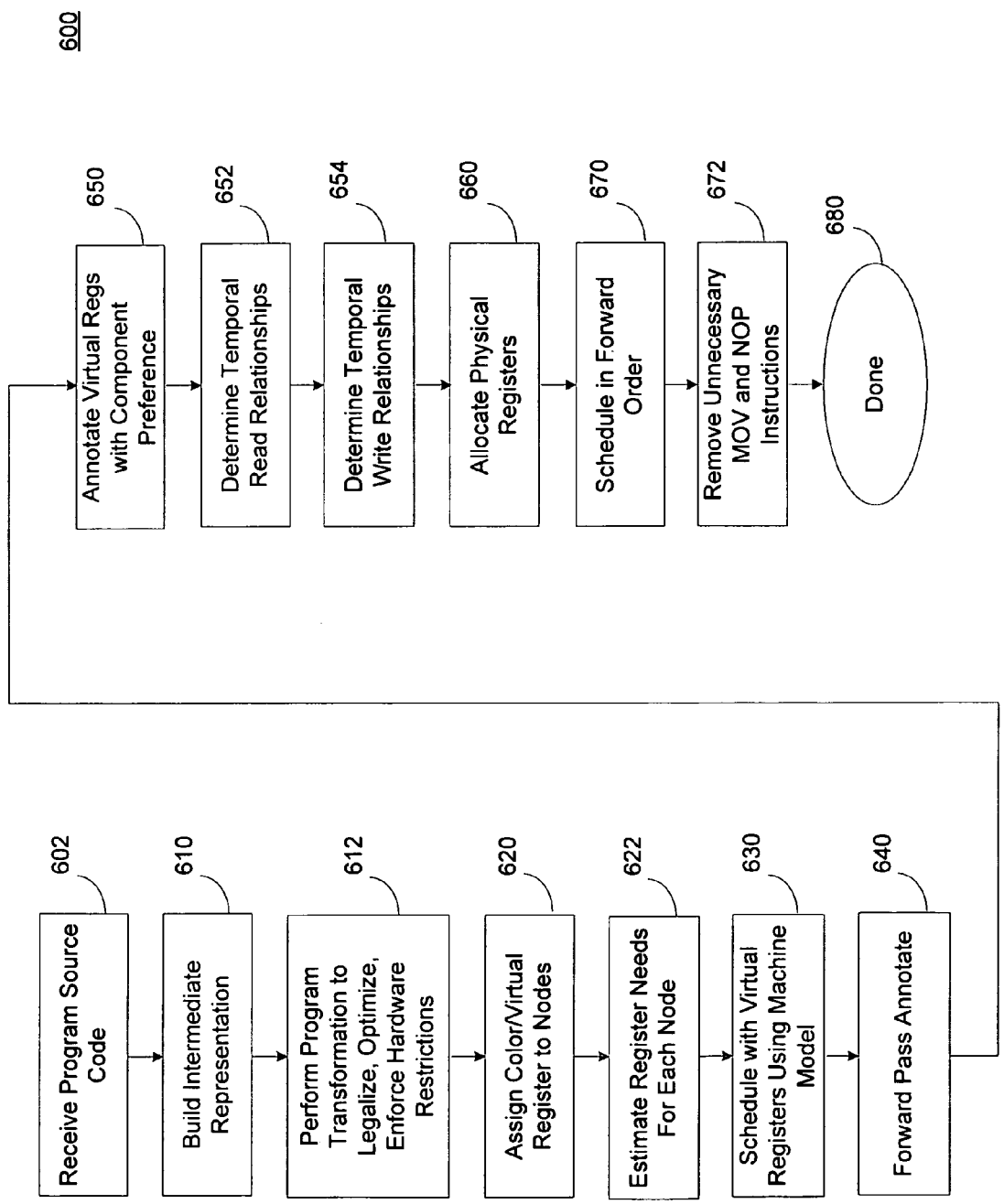
FIG. 6 is a simplified flowchart of a method of code optimization.

FIG. 6 is a simplified flowchart of an embodiment of a method 600 of code optimization. the method 600 can be performed, for example, by the code optimizer of FIG. 4. The method 600 begins at block 602 when the code optimizer receives the program source code. As described earlier, the program source code can be any format source code supported by the code optimizer. The program source code can be, for example, written in a high level language but may also be written in a low level language. The program source code can be, for example, a program such as a fragment shader program used in a parallel pipelined shader.

After receiving the program source code, the code optimizer proceeds to block 610 and builds an intermediate representation of the program code. The intermediate representation is typically a low level code that can be used by the processing hardware. After building the intermediate interface, the code optimizer proceeds to block 612 where the code optimizer performs program transformations to legalize, optimize, and enforce hardware restrictions. For example, the code optimizer may eliminate common sub-expressions or eliminate identity transformations, such as a multiply by 1. The code optimizer may enforce hardware restrictions such as the number of constants that may be referenced by a particular instruction. If such a hardware constraint is identified, the code optimizer can insert, for example, move instructions that move values to registers.

The code optimizer then proceeds to block 620 and assigns virtual colors to nodes. The code optimizer can assign virtual colors to each of the nodes, merge any single reference interpolants, and estimate or otherwise approximate the register needs for each node. The code optimizer can assign the virtual colors by assigning a virtual register number to each of the registers used in a node. The code optimizer proceeds to block 622 and can determine or otherwise estimate the number of registers required for the remaining nodes below any particular node.

The code optimizer proceeds to block 630 and schedules the instructions using the virtual registers. The code optimizer can, for example, schedule the instructions with virtual colors in reverse order using a reverse look-ahead scheduler. The code optimizer can attempt to schedule the instructions to use optimally multiple resources and functional units in one pass while ensuring that a minimal number of registers are used and ensuring that impossible constraints are not imposed on a subsequent register allocator.

The scheduler can use an accurate machine or hardware model and can track the read requirements for each read pass. The scheduler can track and enforce register forwarding by ensuring the register write of a previous instruction occurs in the same pass having a register read by another instruction. The scheduler can also track a number of live components or vector registers at any point in the schedule. If advantageous, the scheduler can split interpolant references if maintaining the register results in overflow of a predetermined register threshold value. The scheduler can issue instructions to recomputed the interpolant access to reduce register pressure.

The scheduler can also choose candidate instructions for scheduling using the estimated number of registers needed by remaining trees in the program. The scheduler can keep the definition and use of non-swizzable virtual registers as close as possible.

After initial scheduling, the code optimizer proceeds to block 640 and performs a forward pass annotation, where the instructions are annotated to note the corresponding pass in which they are scheduled to occur. The code optimizer proceeds to block 650 and annotates each virtual register with a component preference, where component refers to the vector fields in the vector registers. For example, the code optimizer can indicate no preference, a left preference, a right preference, or a particular component combination preference such as xyw preference.

The code optimizer proceeds to block 652 and generates, for each virtual register, a list of virtual register candidates that should be included in a particular read pass. After determining the temporal read relationships, the code optimizer determines temporal write relationships. The code optimizer proceeds to block 654 and generates, for each virtual register, a list of virtual register candidates that should be included in a particular write pass.

The code optimizer proceeds to block 660 and allocates the virtual registers to physical registers from a register pool, bank, or file. After allocating virtual registers to physical registers, the code optimizer proceeds to block 670 and schedules the instructions with physical register assignments in a forward order. The code optimizer can opportunistically insert register move instructions to improve the utilization of register forwarding. Similarly, the code optimizer can insert nop instructions to prevent instruction float and further improve the utilization of register forwarding. Following forward scheduling, the code optimizer can proceed to block 672 to perform post pass processing where any unnecessary move or nop instructions previously inserted during forward scheduling are removed. The code optimizer then proceeds to block 680 and is done.

Figure 7:
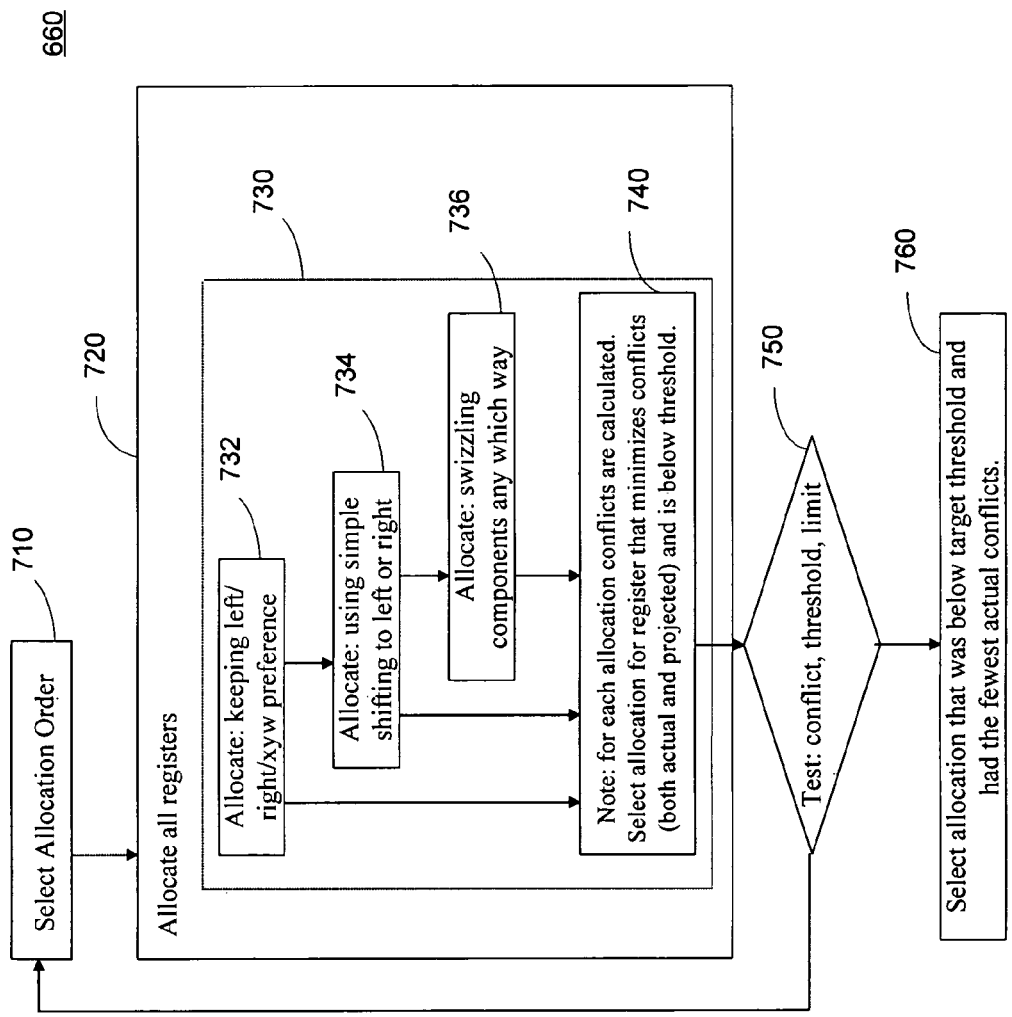
FIG. 7 is a simplified flowchart of a method of register allocation.

FIG. 7 is a simplified flowchart of an embodiment of a method 660 of register allocation. The method 660 can be the method shown in the flowchart of FIG. 6 and may be performed by the code optimizer of FIG. 4.

The method 660 begins at block 710 where the code optimizer selects an allocation order. The manner in which the virtual registers are allocated to physical registers can have an affect on the amount of conflicts that are generated in the scheduled program. Therefore, the code optimizer can include at least one allocation order, or order hierarchy that defines the manner in which the virtual registers are allocated to physical registers. If more than one order hierarchy is used, the code optimizer can include a predetermined order in which the order hierarchies are selected.

After selecting the order hierarchy, the code optimizer proceeds to block 720 to allocate the virtual registers to physical registers according to the selected order. Within each order hierarchy, the code optimizer can allocate the registers using a number of component reorganization preference options. The reorganization preference options can include maintaining component preference, shift allowing, and swizzle allowing.

While performing register allocation, the code optimizer can proceed to block 730 to cycle through all of the configured component preference options for each register. The code optimizer can proceed to block 732 and allocate virtual registers to physical registers maintaining the component preference annotated by the virtual register annotator. Following the register allocation, the code optimizer proceeds to block 740 to determine the number of conflicts associated with the particular register allocation. The code optimizer can store the number of conflicts associated with each allocation iteration.

The code optimizer can also proceed within block 730 to block 734 to allocate the virtual registers to physical registers allowing a left shift or right shift of the components in a virtual register. The code optimizer can proceed to block 740 to determine the number of conflicts associated with this register allocation technique.

Similarly, the code optimizer can proceed within block 730 to block 736 to allocate the virtual registers to physical registers allowing swizzling of register components in any manner allowed. The code optimizer can proceed to block 740 to determine the number of conflicts associated with this register allocation technique.

The code optimizer can proceed from block 740 to decision block 750 to determine if the minimum conflict count is less than a predetermined conflict threshold. Ideally, the register allocation can complete with zero conflicts. However, this is typically not possible for any program other than very simple programs. If the number of conflicts is greater than the predetermined conflict threshold, the code optimizer can proceed back to block 710 and select another allocation order. The code optimizer will continue to loop back to select a new allocation order until the conflict threshold is met or all allocation orders have been selected. Alternatively, the code optimizer can allocate according to all of the possible allocation orders regardless of the number of register allocations having conflicts below the conflict threshold.

If the conflict threshold passes at decision block 750, or if all allocation orders have been tested, the code optimizer proceeds to block 760 and selects the register allocation having conflicts below the threshold or having the fewest actual conflicts, or if more than one register allocation passes the conflicts verification.

Methods and apparatus are described for register allocation in presence of machine constraints with goals of reducing total number of registers used in the program and optimizing for number of passes of a very long instruction word (VLIW) processor with a compiler view of stream of single instructions. The machine characteristics can include vector registers which can be permuted or swizzled in any order of components, thread level parallelism that depends on total number of registers used in each thread, limited bandwidth of reads of register file of vector registers per read-pass, limited bandwidth of writes to register file of vector registers per pass, and passes that may include a stream of multiple quasi-independent vector instructions. Furthermore, certain instructions may require particular subset of registers to be used to allow them to get scheduled in same pass. To dual issue instructions in a stage, registers may need to be allocated in xyz/w or xy/zw slots for certain instructions. Results of some instructions in a pass may be consumed by other instructions in the same pass without consuming any bandwidth of reading register file of a read-pass.

The code optimizer schedules with an accurate machine model assuming optimistic register allocation, determines constraints imposed on register allocation, allocating registers that conform to the previously determined constraints, and re-schedules to optimize for performance and in cases where register allocation could not satisfy all the constraints.

The various illustrative logical blocks, modules, and circuits described in connection with the embodiments disclosed herein may be implemented or performed with a general purpose processor, a graphics processing unit, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A computer implemented method of code optimization in presence of hardware constraints, the method comprising:
    scheduling instruction codes using virtual registers in a manner that tends to minimize simultaneous active registers while minimizing a number of passes of a processing unit;
    allocating the virtual registers to physical registers according to a plurality of register allocation orders to produce a corresponding plurality of physical register allocations;
    determining a conflict value for each register allocation from the plurality of physical register allocations, wherein the conflict value is determined based on a number of times a read or a write bandwidth constraint of the processing unit is exceeded, the read and write bandwidth constraints corresponding to a maximum number of register read or write operations, respectively, that the processing unit can perform in a given pass;
    determining a physical register allocation corresponding to a least conflict value; and
    rescheduling the instruction codes using the physical register allocation to optimize the code by further reducing a number of conflicts.

2. The computer implemented method of claim 1, wherein scheduling instruction codes using virtual registers comprises:
    tracking register read requirements; and
    scheduling instructions in reverse order using virtual vector registers having multiple vector components to maintain register read requirements below a predetermined read bandwidth.

3. The computer implemented method of claim 1, wherein scheduling instruction codes using virtual registers comprises scheduling multiple instructions in reverse order using virtual vector registers in a manner that tends to maximize dual issue of instructions.

4. The computer implemented method of claim 1, wherein allocating the virtual registers to physical registers according to the plurality of register allocation orders comprises:
    selecting an allocation order from the plurality of register allocation orders; and
    allocating the virtual registers to physical registers according to each of a plurality of register component preferences.

5. The computer implemented method of claim 4, wherein the plurality of register component preferences is selected from the group comprising maintaining component preference, shift allowing, and swizzle allowing.

6. The computer implemented method of claim 1, wherein the plurality of register allocation orders comprise at least one allocation order selected from the group comprising interference count order, definition order, and reference order.

7. The computer implemented method of claim 1, wherein rescheduling the instruction codes comprises inserting register move instructions to increase register forwarding.

8. The computer implemented method of claim 1, wherein rescheduling the instruction codes comprises inserting nop instructions to decrease breaks in register forwarding.

9. A computer implemented method of code optimization in presence of hardware constraints, the method comprising:
    generating graph coloring of nodes of a program to identify a plurality of virtual registers, at least one virtual register of the plurality of virtual registers comprising a virtual vector register having a plurality of vector components;
    scheduling the program using a reverse look-ahead scheduler having a hardware model to reduce a number of live virtual registers while tending to minimize a number of processor passes of a processing unit;
    annotating the virtual registers with vector component preferences;
    allocating the virtual registers to physical registers using a plurality of register allocation orders to generate a corresponding plurality of register allocations;
    selecting a register allocation from the plurality of register allocations based on a conflict metric, wherein the conflict metric is determined based on a number of times a read or a write bandwidth constraint of the processing unit is exceeded, the read and write bandwidth constraints corresponding to a maximum number of register read or write operations, respectively, that the processing unit can perform in a given processor pass; and
    rescheduling the program in a forward scheduler to optimize the code by further reducing conflicts based on the conflict metric.

10. The computer implemented method of claim 9, wherein annotating the virtual registers comprises:
    annotating each virtual register with a vector component preference;
    generating a write list, for each virtual register, of virtual register candidates that are to be scheduled in a same write pass during the program; and
    generating a read list, for each virtual register, of virtual register candidates that are to be scheduled in a same read pass during the program.

11. The computer implemented method of claim 9, wherein allocating the virtual registers to physical registers comprises:
    selecting an allocation order from the plurality of register allocation orders; and
    allocating the virtual registers to physical registers according to each of a plurality of register component reorganization preferences.

12. The computer implemented method of claim 9, wherein allocating the virtual registers to physical registers comprises generating the conflict metric corresponding to each of the plurality of register allocations.

13. The computer implemented method of claim 9, wherein selecting the register allocation comprises selecting the register allocation corresponding to a minimum conflict metric value.

14. An apparatus configured to optimize code in presence of hardware constraints, the apparatus comprising:
   a processor;
   a reverse look-ahead scheduler configured to schedule a program using a plurality of virtual vector registers in a manner that tends to minimize live virtual registers while minimizing processing passes, each virtual vector register having a plurality of vector components;
   a register annotator coupled to the reverse look-ahead scheduler and configured to annotate each of the plurality of virtual vector registers with vector component preferences;
   a register allocator coupled to the register annotator and configured to generate a plurality of register allocations corresponding to a plurality of allocation orders by allocating virtual vector registers to physical vector registers based in part on an allocation order wherein a conflict value is determined for each register allocation from the plurality of register allocations, wherein the conflict value is determined based on a number of times a read or a write bandwidth constraint of the processor is exceeded, the read and write bandwidth constraints corresponding to a maximum number of register read or write operations, respectively, that the processor can perform in a given pass; and
   a forward scheduler coupled to the register allocator and configured to select a register allocation from the plurality of register allocations based on the conflict value and reschedule the program with the physical vector registers to optimize the code by reducing schedule conflicts identified during register allocation.

15. The apparatus of claim 14, further comprising a graph coloring module configured to receive the program and generate a list of virtual vector registers for use by the reverse look-ahead scheduler.

16. The apparatus of claim 14, further comprising a forward pass annotator coupled to the reverse look-ahead scheduler and configured to annotate each instruction in the program with a corresponding processing pass identifier.

17. The apparatus of claim 14, wherein the register annotator is further configured to generate a write list, for each virtual vector register, of virtual register candidates that are to be scheduled in a same write pass during the program and generate a read list, for each virtual vector register, of virtual register candidates that are to be scheduled in a same read pass during the program.

18. The apparatus of claim 14, wherein the register allocator comprises:
   an allocation order module configured to store the plurality of allocation orders;
   a register allocation module coupled to the allocation order module and configured to allocate the virtual vector registers to physical vector registers based in part on an active allocation order; and
   a conflict metric module coupled to the register allocation module and configured to determine the conflict value corresponding to the register allocation corresponding to the active allocation order.

19. The apparatus of claim 14, wherein the register allocator comprises a register allocation module comprising:
   a register shifter configured to shift components of one or more virtual vector registers during register allocation; and
   a register swizzler configured to swizzle components of one or more virtual vector registers during register allocation.

\* \* \* \* \*